Figure 1:
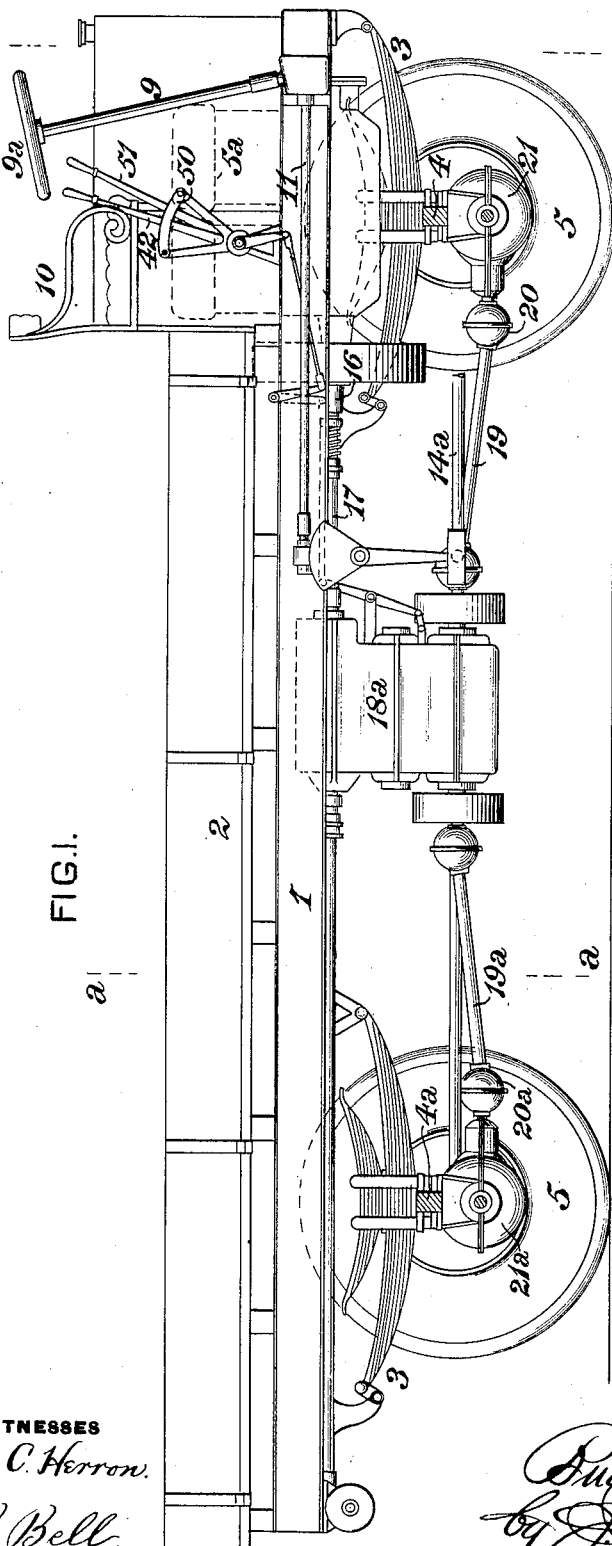

B. D. GRAY.
MOTOR VEHICLE.
APPLICATION FILED MAY 6, 1907.

940,145.

Patented Nov. 16, 1909.
5 SHEETS—SHEET 1.

WITNESSES
James C. Herron.
S. K. Bell.

INVENTOR
Budd D. Gray
by Snowden Bell,
Att'y.

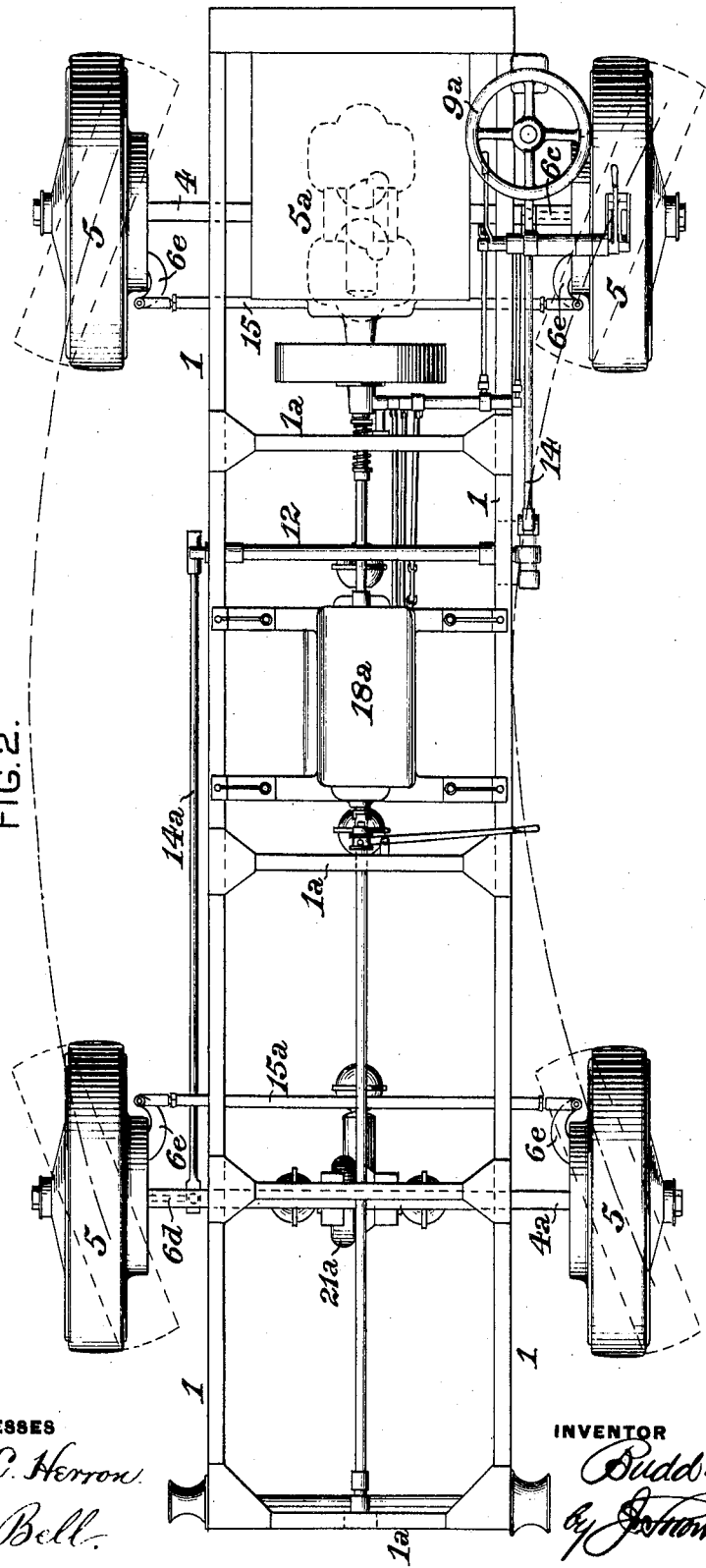

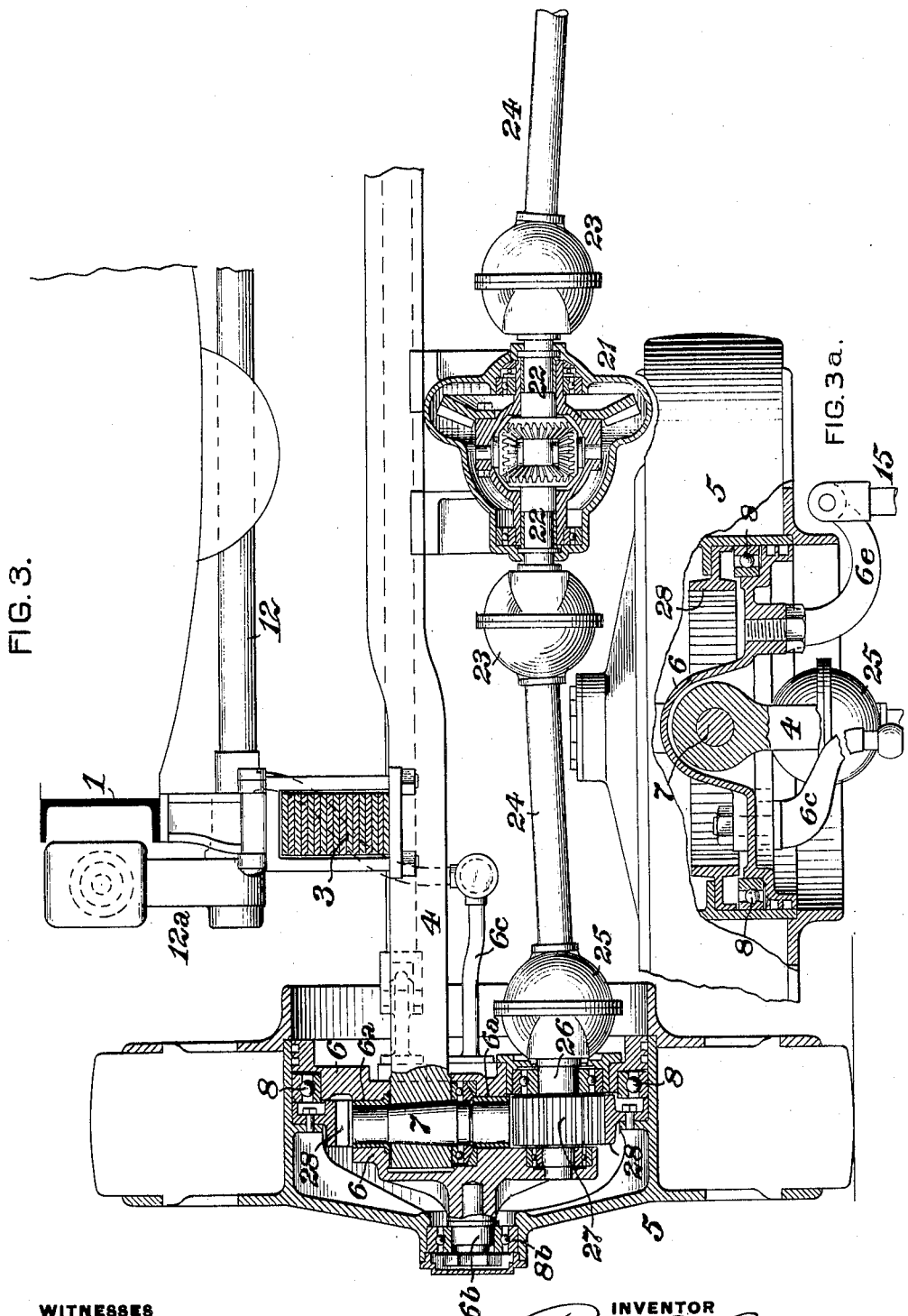

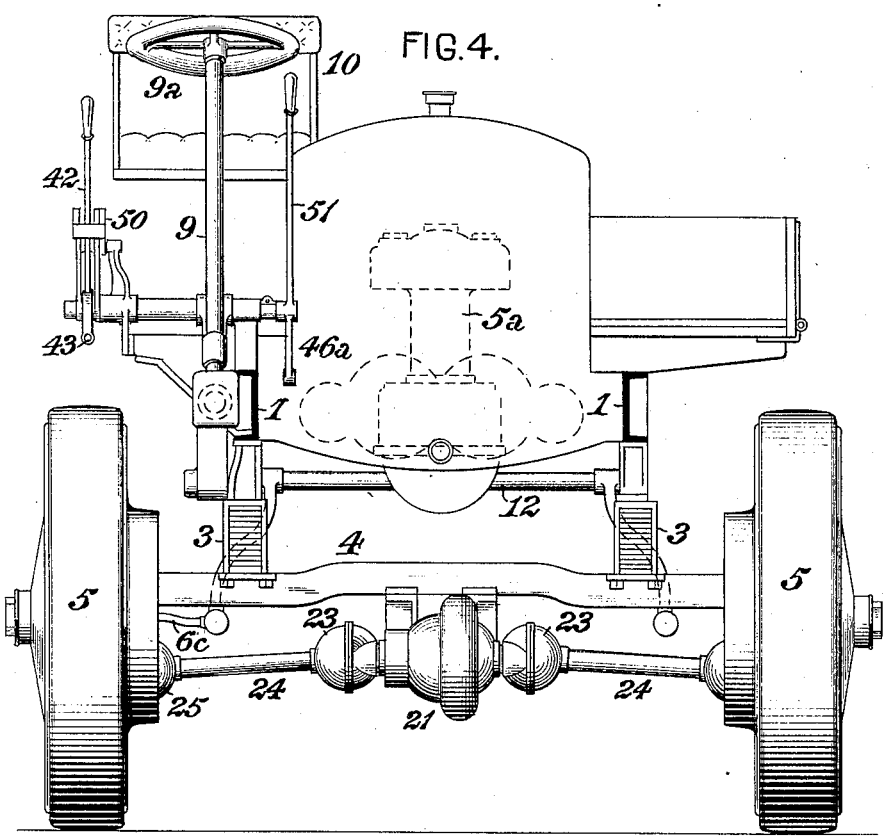
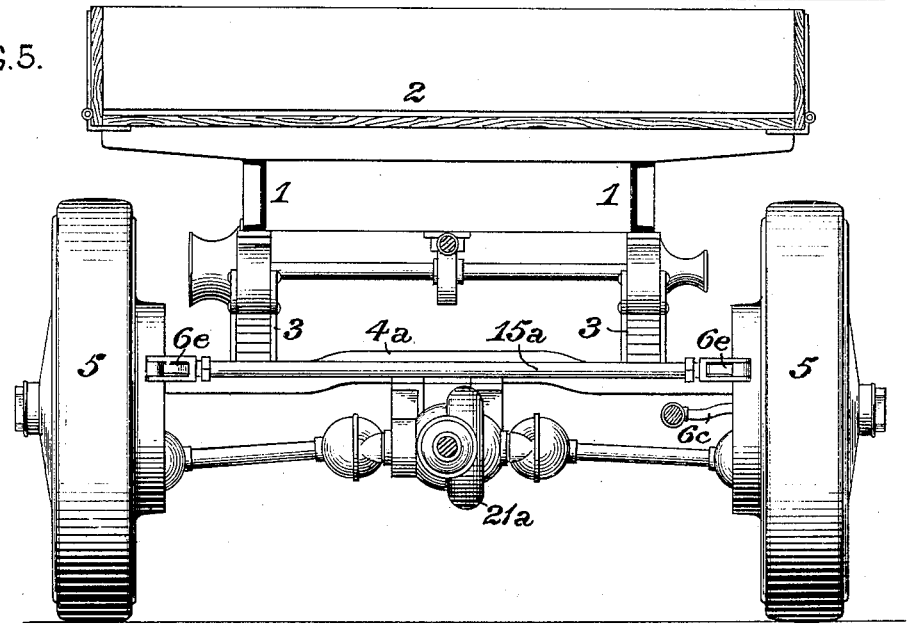

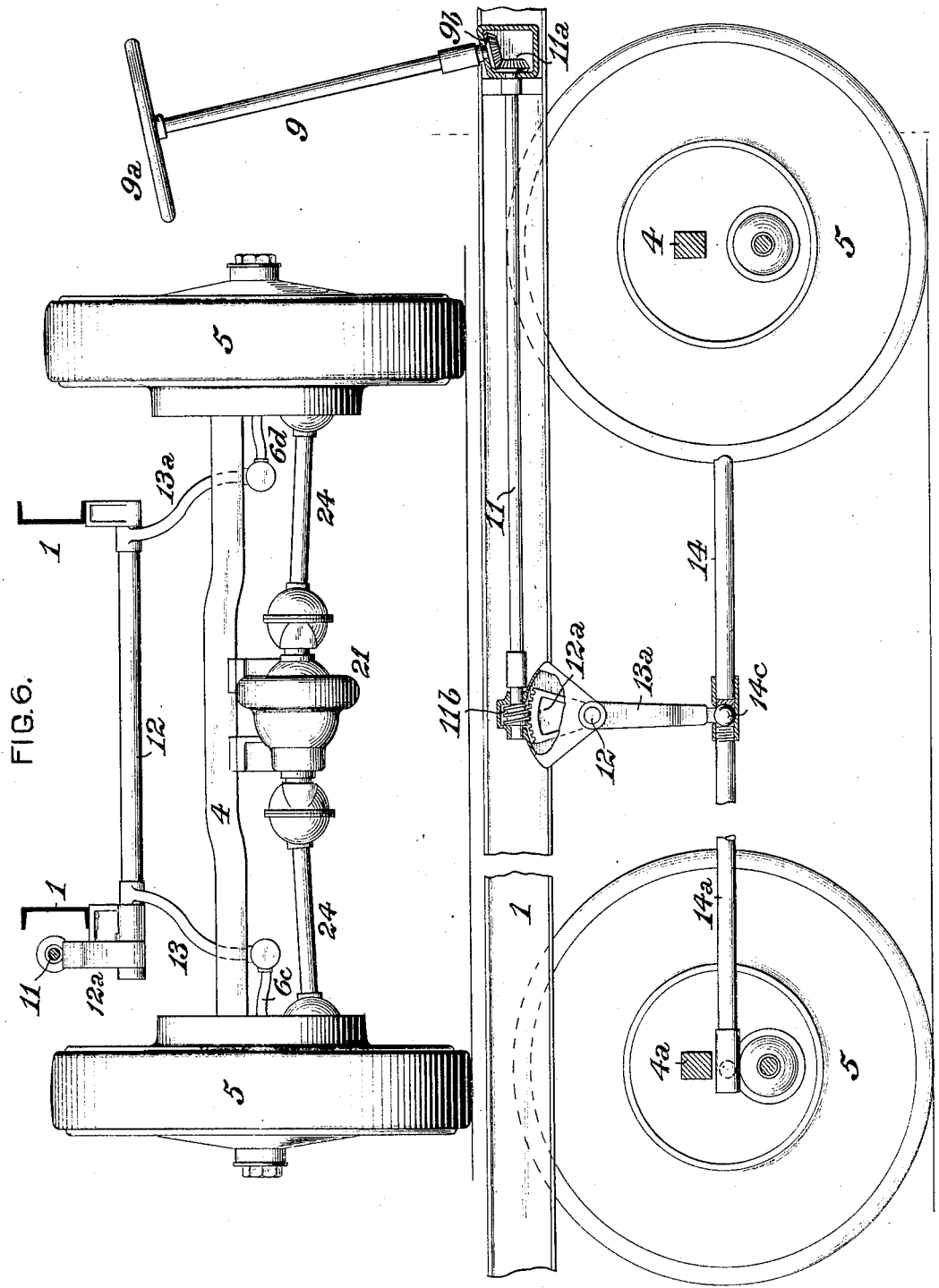

UNITED STATES PATENT OFFICE.

BUDD D. GRAY, OF PROVIDENCE, RHODE ISLAND, ASSIGNOR TO AMERICAN LOCOMOTIVE COMPANY, OF NEW YORK, N. Y., A CORPORATION OF NEW YORK.

MOTOR-VEHICLE.

940,145.  Specification of Letters Patent.  Patented Nov. 16, 1909.

Application filed May 6, 1907. Serial No. 372,091.

*To all whom it may concern:*

Be it known that I, BUDD D. GRAY, of Providence, in the county of Providence and State of Rhode Island, have invented a certain new and useful Improvement in Motor-Vehicles, of which improvement the following is a specification.

My invention relates to motor vehicles of the general class or type known as "four wheel drive" vehicles, in which the power of the motor is applied to all of the four wheels upon which the vehicle is carried, and its objects are to provide improved mechanism for the application of powder to wheels which are adapted to be moved manually relatively to the vehicle body for the purpose of steering the vehicle, and to provide an improved steering mechanism whereby the pairs of wheels of two axles may be so moved coincidently and in opposite directions respectively.

The improvement claimed is hereinafter fully set forth.

In the accompanying drawings: Figure 1 is a view, partly in side elevation and partly in vertical longitudinal section, of a commercial motor vehicle or truck, illustrating an application of my invention: Fig. 2, a plan or top view of the same, with the flooring removed: Fig. 3, a partial transverse section, on an enlarged scale and on the central plane of one of the axles; Fig. 3$^a$, a horizontal section taken centrally through the hub of one of the wheels, and through the steering knuckle and steering pin near the top of the axle; Fig. 4, a front view, in elevation; Fig. 5, a transverse section, on the line $a$ $a$ of Fig. 1; Fig. 6, a transverse section through the frame, showing, in elevation, the steering apparatus as seen from the front; Fig. 7, a view, partly in side elevation and partly in section, illustrating the mechanism for manually imparting steering movement to the wheels.

In the practice of my invention, I provide a substantial frame, which is preferably formed of longitudinal rails of metal, 1, of any suitable and desired section, as, for example, channels, connected by cross bars, 1$^a$, upon which is secured a body, 2, which, in the instance shown, is of rectangular form and open topped for the reception of a load. The frame and body are supported, through the intermediation of springs, 3, upon a front axle, 4, and a rear axle, 4$^a$, which are preferably solid forgings, of rectangular or I section, and which are secured to the springs, 3, and a pair of wheels, 5, supports each of the axles, to which the wheels are coupled, with the capacity of movement about vertical axes in their central planes, as presently to be described. A motor, 5$^a$, of any suitable and preferred type, indicated by dotted lines in Figs. 1, 2, and 4, is mounted upon the forward portion of the frame, and its driving or crank shaft is connected, through a system of shafts and gearing hereinafter described, with each of the four wheels of the vehicle, to which the driving power of the motor is thereby transmitted.

The wheels, 5, support the fixed axles, 4 and 4$^a$, relatively to which they are mounted eccentrically through the intermediation of bearing members, 6, which, for convenience of reference and in view of one of the functions which they perform, will be termed "steering knuckles", and which are connected to the axles, 4 and 4$^a$, by vertical pivots, 7, which will be termed "steering pins", and which are secured to, and project above and below the axles, in or near the vertical central planes of the wheels. Sleeves or bushings, 6$^a$, fixed in the steering knuckles, fit truly on the upper and lower journals or projecting portions of the steering pins, 7, about which, as pivots, the steering knuckles are movable, and journals, 6$^b$, are formed on the outer sides of the steering knuckles, in line axially with the wheels. The wheels are mounted and rotate upon the peripheries and upon the journals, 6$^b$, of the steering knuckles, through the intermediation of ball bearings, 8 and 8$^b$, respectively, the relation of the wheels and steering knuckles being undisturbed by the movements imparted to the latter about the axes of the steering pins for the purpose of steering the vehicle, which movements are manually effected, as from time to time required, by the following operating mechanism. An inclined shaft, 9, journaled near the front of the vehicle, carries, upon its upper end, a hand wheel, 9$^a$, which is located in convenient proximity to the driver's seat, 10, and has secured upon its lower end a bevel pinion, 9$^b$, which meshes with a corresponding pinion, 11$^a$, on the forward end of a longitudinal shaft, 11, upon the rear end of which is fixed a worm, 11$^b$, meshing with a worm wheel segment, 12$^a$, on a transverse shaft, 12, journaled below the frame. Lever arms, 13 and 13ª, are secured upon the shaft, 12, adjacent to its ends, the arm, 13, being coupled by a rod, 14, to a horizontal lever arm, 6ᶜ, secured to the inner side of the steering knuckle, 6, of one of the wheels, in this case the right hand wheel of the front axle, 4, and the arm, 13ª, being coupled by a rod, 14ª, to a similar lever arm, 6ᵈ, secured to the inner side of the steering knuckle of the opposite wheel of the rear axle, 4ª. The rods, 14 and 14ª, are provided with ball joints at each end, to admit of flexibility in all directions, one of these ball joints, 14ᶜ, being shown in Fig. 7. The front and rear pairs of wheels are each maintained in parallelism by transverse connecting rods, 15 and 15ª, respectively, said rods being coupled, at their ends, to horizontal arms, 6ᵉ, secured to the steering knuckles. By turning the hand wheel, 9ª, in one direction, as for example, to the right, the front wheels will be deflected in the same direction, as indicated in dotted lines in Fig. 2, and the rear wheels will be deflected in the opposite direction, or to the left, and will follow in the tracks of the front wheels. By reason of the simultaneous and equal movement of the front and rear wheels in opposite directions which is effected as above described, the vehicle may be turned in an extremely small radius of curvature, and, moreover, may be driven backward as readily as forward, the steering action being the same in both directions.

The driving shaft of the motor, 5ª, is connected by a suitable clutch coupling, 16, to a longitudinal shaft, 17, which is coupled to a primary gear shaft, 18, journaled in a gear case, 18ª, supported on two of the cross bars of the vehicle frame. The primary gear shaft, 18, imparts, through a system of adjustable transmission gearing hereinafter described, rotation to two longitudinal shafts, 19, 19ª, extending forwardly and rearwardly from the gear case, in the vertical central plane of the vehicle, and connected, through universal joints, 20, 20ª, respectively, to systems of bevel gearing inclosed in gear cases, 21, 21ª, located beneath, and supported on, the front and rear axles, 4 and 4ª, respectively. This gearing and the transmission of power therefrom to the wheels being similar for the two axles, a description of the driving mechanism of the wheels of the front axle will only be made. The specific form of gearing herein shown as inclosed in the gear case, 21, does not, in and of itself, form part of my present invention, and it will therefore suffice to say that it is of an ordinary type of differential or compensating gear known in the art and serves to transmit rotation from the shaft, 19, to two transverse shafts, 22, journaled in the case, 21, and coupled by universal joints, 23, to shafts, 24, which are in turn coupled by universal joints, 25, to shafts 26. The shafts, 26, are journaled in the steering knuckles, 6, and carry spur pinions, 27, which mesh with internal spur gears, 28, secured to the hubs of the wheels, 5, which, through the connections above described, are rotated by the motor, 5ª. Slip joints, of any suitable and preferred known form, are interposed between the shafts, 24, and the universal joints, 23. When the wheels are turned about the vertical axes of the steering pins, 7, the universal and slip joints permit the transmission of power to the wheels regardless of the positions into which they may be moved.

It will be noted as a substantial practical advantage of the construction above described, that all the working parts of the driving and steering connections to the wheels are inclosed in the wheel hubs, and are thereby protected from the access of dirt, water, or other foreign matter, correspondingly insuring durability with a minimum amount of attention and cost of maintenance.

I claim as my invention and desire to secure by Letters Patent:

1. In a motor vehicle, the combination of a fixed axle, a steering pin secured therein adjacent to one of its ends and having journals projecting above and below the axle, a steering knuckle mounted on and vibratable about the steering pin and having a peripheral bearing surface and a central journal, a supporting wheel eccentric to the axle and having a hub inclosing the steering pin and steering knuckle and mounted rotatably on the peripheral bearing surface and central journal of the steering knuckle, a gear journaled in the steering knuckle, a gear fixed to the wheel and engaging the gear of the steering knuckle, means eccentric to the wheel for rotating the gear of the steering knuckle, and means for moving the steering knuckle about the axis of the steering pin.

2. In a motor vehicle, the combination of a fixed axle, a steering pin secured therein adjacent to one of its ends and having journals projecting above and below the axle, a steering knuckle mounted on and vibratable about the steering pin and having a peripheral bearing surface and a central journal, a supporting wheel having a hub inclosing the steering pin and steering knuckle and mounted rotatably on the peripheral bearing surface and central journal of the steering knuckle, a gear journaled in the steering knuckle, a gear fixed to the wheel and engaging the gear of the steering knuckle, a lever arm secured to and projecting inwardly from the steering knuckle, a driving shaft eccentric to the wheel, and a universal joint connecting the driving shaft with the shaft of the gear of the steering knuckle.

3. In a motor vehicle the combination of a fixed axle, a supporting wheel fitted to rotate on bearings eccentric to the axle, a steering knuckle for said supporting wheel, consisting of a plate or disk having a peripheral wheel bearing surface and a central journal, sockets or bearings perpendicular to its axis to fit the journals of a steering pin, and sockets or bearings parallel with its axis to receive the shaft of a wheel driving gear.

BUDD D. GRAY.

Witnesses:
F. R. BOYNTON,
JOHN L. ARMSTRONG.